Figure 1:
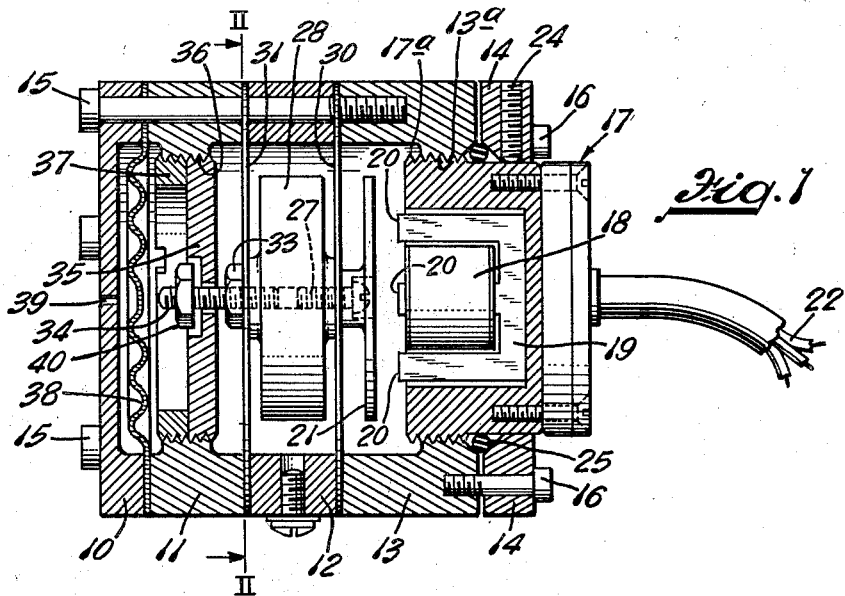

Oct. 23, 1956     L. A. G. TER VEEN ET AL     2,767,973

ACCELEROMETERS

Filed Jan. 19, 1953

*INVENTOR.*
L.A.G. ter Veen
H.A. Siltamaki
BY
ATTORNEY

United States Patent Office 2,767,973
Patented Oct. 23, 1956

2,767,973

ACCELEROMETERS

Louis A. G. ter Veen, North Hollywood, and Harold A. Siltamaki, Burbank, Calif., assignors to Bendix Aviation Corporation, North Hollywood, Calif., a corporation of Delaware Application January 19, 1953, Serial No. 331,902

2 Claims. (Cl. 264—1)

This invention relates to gauges for measuring acceleration, commonly referred to as accelerometers, and particularly to accelerometers for converting acceleration values into electrical values for transmission to a distance.

An object of the invention is to provide a simple and rugged accelerometer that is responsive to acceleration forces along a desired axis and non-responsive to acceleration forces in directions normal to said axis.

Another object is to provide in an accelerometer an accessible adjustable stop structure for limiting movement of the acceleration element at both ends of its range.

Other more specific objects and features of the invention will become apparent from the description to follow.

A common type of accelerometer consists of a case containing a mass element movably supported by a diaphragm or spider so that it can move relative to the case in response to acceleration of the latter, the extent of movement being proportional to the magnitude of the acceleration. The mass element may include an armature element or pad constituting a portion of the magnetic circuit of a coil so that the inductance of the coil varies with the position of the mass element and hence with the acceleration. The coil constitutes a pick-up means, and by connecting the coil in a suitable electric circuit the acceleration can be measured.

It is often desirable to know the acceleration along an axis normal to the supporting diaphragm or spider, and to avoid errors the mass element must be prevented from any movement other than linear movement along the desired axis. This is not obtainable with a single supporting diaphragm or spider because such structures are capable of flexing to permit rocking movement of the mass element in addition to linear movement. Such rocking movement is prevented in accordance with the present invention by supporting the mass between two spiders.

Accelerometers are often subjected to accelerations greater than they are intended to measure and it is desirable to provide stops for preventing movement of the mass element beyond certain limits. Where the mass element includes a pad on one end adjacent a coil it is difficult to provide an accessible adjustable stop between the pad and the coil for limiting movement of the mass element toward the coil. This problem is solved in accordance with the invention by providing an adjustable apertured disc on the side of the mass element remote from the coil, extending a threaded stem from the mass element through the aperture, and providing stop nuts on the stem on opposite sides of and spaced from the disc. The limit of movement of the mass away from the coil can be determined or set by adjusting the disc to proper spacing from the inner nut, after which the limit of movement toward the coil is set by adjusting the outer nut on the stem.

Figure 2:
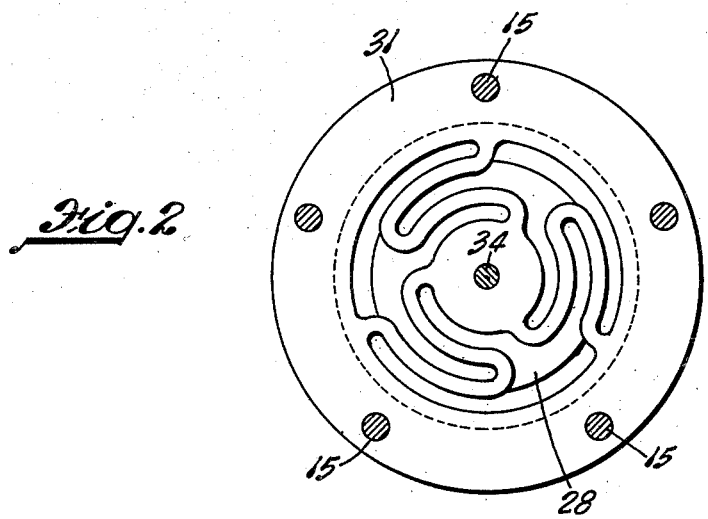

A full understanding of the invention may be had from the following detailed description with reference to the drawing in which:

Fig. 1 is a longitudinal sectional view of an accelerometer in accordance with the invention; and Fig. 2 is a cross section in the plane II—II of Fig. 1.

Referring to Fig. 1, the accelerometer therein disclosed comprises a casing consisting of a plurality of sections 10, 11, 12, 13 and 14, all of cylindrical external shape and stacked together. The sections 10, 11, 12 and 13 are held together by screws 15 which are extended from the left end of the casing through apertures in the sections 10, 11 and 12 and screwed into threaded apertures in the section 13. The section 14 is separately secured to the section 13 by screws 16.

The right end of the case is closed by a closure member 17 having external screw threads 17a thereon which screw into internal screw threads 13a in the casing section 13. This closure member 17 contains the electrical portion of the device which comprises a pick-up coil 18 having a core 19 having pole faces 20 which lie in a common plane and are juxtaposed to a pad 21, to be described later. Suffice it to say at this point that movement of the pad, which is of paramagnetic material, toward and away from the pole faces 20 varies the inductance of the coil 18. The coil is adapted to be connected by suitable leads 22 to electrical equipment which is responsive to the changes in inductance. The closure member 17 can be adjusted into the desired position with respect to the pad 21 by screwing it into or out of the casing section 13, and locking it in position by means of a set screw 24 in the casing section 14. A sealing ring 25 seals the joint between the casing sections 13 and 14 and the closure member 17.

The pad 21 previously referred to is secured as by means of a screw 27, to the front end of a heavy disc 28. The assembly of the pad 21 and the disc 28 constitutes the mass element of the accelerometer and is supported within the casing by a pair of spiders 30 and 31 respectively. The shape of these spiders is clearly shown in Fig. 2. They quite rigidly support the disc 28 against radial movement while permitting free axial movement thereof. The spider 30 is clamped at its center between the pad 21 and the disc 28 by the screw 27, and is clamped at its periphery between the casing elements 12 and 13. The spider 31 is clamped at its center to the disc 28 by a nut 33 threaded on a screw 34 which is threaded into the disc 28, and the periphery of the spider 31 is clamped between the casing sections 11 and 12.

To limit axial movement of the mass element, a stop plate in the form of a disc 35 is provided. This disc 35 is threaded into threads 36 in the casing section 11 so that it can be adjusted toward and away from the mass element 28 by rotating it. When positioned in desired relation with respect to the nut 33 on the mass element, it is locked in place by a lock ring 37. The casing is sealed by a diaphragm 38 which is positioned between the casing sections 10 and 11. This diaphragm makes it possible to fill the body of the instrument with a suitable oil without subjecting the interior to variations in pressure caused by expansion and contraction of the oil. The casing section 10 constitutes a rear cover member and is provided with a vent aperture 39 to apply atmospheric pressure to the diaphragm 38.

To limit movement of the mass element 28 to the right toward the pickup coil 18, a nut 40 is provided on the screw 34 exterior of the adjusting disc 35.

In assembling the device, the casing sections 11, 12 and 13 can first be assembled with short screws leaving the cover section 10 and the diaphragm 38 off, so that the adjusting disc 35, the ring 37 and the nut 40 are accessible. The disc 35 is then rotated in the threads 36 until it is in desired spaced relation with respect to the nut 33, and it is then locked in position with the locking ring 37. The outer nut 40 is then rotated until it is in desired spaced relation with the disc 35 to limit rightward movement of the mass element. This nut 40 is fitted tightly on the threads of the screw 34 so that it remains in the desired position of adjustment. Thereafter, the temporary screws are removed, the diaphragm 38 and cover section 10 are placed in position, and the sections 10, 11, 12 and 13 are secured together with the permanent screws 15.

It will be observed that the closure member 17 containing the pickup coil 18 can be removed from or inserted in the assembly without disturbing the stop adjustment previously described.

Although for the purpose of explaining the invention, a particular embodiment thereof has been shown and described, obvious modifications will occur to a person skilled in the art, and we do not desire to be limited to the exact details shown and described.

We claim:

1. A telemetering accelerometer comprising: casing means having ends; a mass element; means supporting said mass element within said casing for linear movement toward and away from said ends; pick-up means at one end of said casing responsive to the spacing of said mass element therefrom; an apertured disc positioned beyond the end of said element remote from said pick-up means, and cooperating screw threads on said disc and casing, respectively, for longitudinally adjustably supporting said disc with respect to the casing; a stem on said element extending longitudinally therefrom through the aperture in said disc; an inner abutment member secured to said stem for limiting movement of said element away from said pick-up means by abutment against said disc; an outer abutment member on said stem for limiting movement of said element toward said pick-up means by abutment against said disc, and cooperating screw threads on said stem and outer abutment member, respectively, for longitudinally adjustably supporting the latter with respect to the stem.

2. An accelerometer in accordance with claim 1 in which said casing means includes a detachable cover section adjacent said aperture disc and remote from said pick-up means for enabling adjustment of said disc and outer abutment members without disturbing the relation between said mass element and said pick-up means.

References Cited in the file of this patent

UNITED STATES PATENTS

| | | |
|---|---|---|
| 2,302,670 | Buchanan | Nov. 24, 1942 |
| 2,387,066 | Harding | Oct. 16, 1945 |
| 2,440,605 | Hathaway | Apr. 27, 1948 |
| 2,570,672 | Hathaway | Oct. 9, 1951 |
| 2,639,115 | Iredell | May 19, 1953 |
| 2,643,869 | Clark | June 30, 1953 |

OTHER REFERENCES

"Accurate accelerometers developed by the Bureau of Public Roads," in Public Roads, December 1924, pages 1 to 9.